(12) United States Patent
Centerbar

(10) Patent No.: US 10,538,196 B2
(45) Date of Patent: Jan. 21, 2020

(54) RECOVERY TOOL TO USE WITH A VEHICLE

(71) Applicant: Brian L. Centerbar, Ft. Edward, NY (US)

(72) Inventor: Brian L. Centerbar, Ft. Edward, NY (US)

( * ) Notice: Subject to any disclaimer, the term of this patent is extended or adjusted under 35 U.S.C. 154(b) by 199 days.

(21) Appl. No.: 15/283,335

(22) Filed: Oct. 1, 2016

(65) Prior Publication Data

US 2018/0092285 A1 Apr. 5, 2018

(51) Int. Cl.
| | |
|---|---|
| *A01B 59/06* | (2006.01) |
| *B60Q 1/34* | (2006.01) |
| *B60D 1/62* | (2006.01) |
| *B60D 1/07* | (2006.01) |

(52) U.S. Cl.
CPC .............. *B60Q 1/34* (2013.01); *A01B 59/066* (2013.01); *B60D 1/07* (2013.01); *B60D 1/62* (2013.01)

(58) Field of Classification Search
CPC .................................. A01B 59/066; B60D 1/07
See application file for complete search history.

(56) References Cited

U.S. PATENT DOCUMENTS

| | | | | |
|---|---|---|---|---|
| 1,957,103 A | * | 5/1934 | Prink ...................... | E01H 5/063 37/232 |
| 4,369,590 A | * | 1/1983 | Miller ................... | E02F 3/7627 172/247 |
| 4,403,432 A | * | 9/1983 | Biance .................... | E01H 5/068 172/445.2 |
| 4,821,436 A | * | 4/1989 | Slocum .................... | E01H 5/06 172/811 |
| 5,423,394 A | | 6/1995 | Kendle | |
| 5,595,007 A | * | 1/1997 | Biance .................... | E01H 5/068 172/445.2 |
| 5,647,153 A | * | 7/1997 | Gervais .................... | E01H 5/06 172/272 |
| 6,148,928 A | | 11/2000 | Spears | |
| 6,257,347 B1 | | 7/2001 | Campisi | |
| 6,293,351 B1 | * | 9/2001 | Schmidt .................. | E01H 5/068 172/439 |
| 6,796,384 B1 | | 9/2004 | Potter | |
| 7,665,233 B2 | * | 2/2010 | Lemieux ................. | E01H 5/068 37/236 |
| 7,997,015 B2 | | 8/2011 | Bank | |

(Continued)

*Primary Examiner* — Matthew Troutman
(74) *Attorney, Agent, or Firm* — GFD Patents LLC; Gerald F. Dudding

(57) ABSTRACT

A recovery tool configured to attach to the rear or front a vehicle with a receiver hitch class III and up to provide interconnect and control between the vehicle and various accessory tools necessary to perform lift, drag, tow and pull using the vehicle. The recovery tool has a head gear connected to a hitch attachment where the hitch attachment connects the recovery tool to the vehicle. The recovery tool has lights for signaling, work lights, and other uses. The recovery tool can be controlled by a wireless controller. The recovery tool is adaptable to three-point tractor implement. The recovery tool may further include a hydraulic unit and can endure heavy mechanical work to perform dragging snow or dirt, road cleaning, driveway scraping, towing and recovery, search and rescue operation, pull boat docks and launch boats, dragging logs or broken articles as well as jump start truck or car.

31 Claims, 14 Drawing Sheets

(56) References Cited

U.S. PATENT DOCUMENTS

| | | |
|---|---|---|
| 8,087,866 B2 | 1/2012 | Fast |
| 2007/0166138 A1 | 7/2007 | Brooks |
| 2007/0256846 A1* | 11/2007 | Gibbs ............... A01B 59/06 172/452 |
| 2009/0162168 A1* | 6/2009 | Fast ............... A01B 59/043 414/24.5 |
| 2010/0101119 A1 | 4/2010 | Roberts |
| 2011/0147020 A1 | 6/2011 | Waltz |
| 2011/0206488 A1 | 8/2011 | Windsor |
| 2017/0015162 A1* | 1/2017 | Walter ............... B60D 1/06 |

* cited by examiner

RECOVERY TOOL TO USE WITH A VEHICLE

FIELD

The disclosure generally relates to a recovery to use with a vehicle.

BACKGROUND

Three point hitches are commonly used for providing interconnect and control between a vehicle such as a pick-up truck, trailer, tractor and an implement such as a plow, mower or tiller. Many vehicles have a hitch in their rear part to couple the vehicle to the implements. For example, U.S. Pat. No. 5,423,394 A issued to Thomas D. Kendle on 1993, Jun. 21, discloses a three-point hitch for a vehicle such as hummer truck, pickup truck, trailer etc. to mount an agricultural equipment. Similarly, U.S. Pat. No. 6,148,928 A issued to Lonnie K. Spears on 1999, Apr. 16 discusses a three-point hitch mounting system connecting a pick-up truck to a three-point hitch to operate implements such as mowers, plows, tillers. Similarly, U.S. Pat. No. 6,796,384 B1 issued to Todd K. Potter on 2003, Apr. 28, discloses an implement mounting fixture for mounting implements such as trucks, tractors etc. to a work machine. However, these devices have limitation in that they only couple vehicle with specific implements for use in specific activities. When a person has to face various situations such as requirement to clean ice or snow from roads, recover a stuck vehicle, use a three-point tractor implement, jump start a vehicle and so on, the person has to purchase different devices and tools for performing these activities, which is very expensive. Further, the person cannot carry multiple tools and devices in vehicle as it will consume a lot of space in the vehicle. Hence, there is a need to provide a device or tool which can connect a three-point tractor implement as well connect various other accessory attachments necessary for performing lift, drag, tow and pull for different activities. Further it is desired that the same tool allow jump starting vehicles. Also, it is desired that the device or tool be operated by remote control.

The inventive aspect overcomes or alleviate the problem of the prior art.

Further the inventive aspect provides the recovery tool to efficiently perform lift, drag, tow and pull using a vehicle as well as provide connection to three-point tractor implement.

SUMMARY

One aspect of the inventive concept can be embodied in a recovery tool configured to perform lift, drag, tow and pull using a vehicle.

Other aspect of the inventive concept can be embodied in a recovery tool configured to attach to the rear or front a vehicle with a receiver hitch class III and up. The recovery tool provides a point of attachment for various accessory tools necessary to perform lift, drag, tow and pull using the vehicle. The recovery tool can be used for various activities including but not limited to performing dragging snow or dirt, road cleaning, driveway scraping, towing and recovery, search and rescue operation, pull boat docks and launch boats, dragging logs out of woods or dragging broken articles and jump start truck or car.

In an example embodiment, the recovery tool is adaptable to three-point tractor implement.

In another example embodiment, the recovery tool provides a hydraulic unit.

In yet another example embodiment, the recovery tool includes a power source.

In yet another example embodiment, the recovery tool receives power from a vehicle.

In yet another example embodiment, the recovery tool provides a lighting system which has different types of lights for supporting use of the recovery tool in performing various types of activities.

In yet another example embodiment, the recovery tool is sturdy and can endure heavy mechanical work.

Other aspects of the inventive subject matter will become apparent from time to time throughout the specification as hereinafter related.

Before explaining at least one embodiment of the inventive aspect in detail, it is to be understood that the inventive aspect is not limited in its application to the details of construction and to the arrangements of the components set forth in the following description or illustrated in the drawings. The inventive aspect is capable of other embodiments and is of being practiced and carried out in various ways. Also, it is to be understood that the phraseology and terminology employed herein are for the purpose of description and should not be regarded as limiting.

These together with other aspects of the inventive subject matter, along with the various features of novelty which characterize the inventive aspects, are pointed out with particularity in the disclosure. For a better understanding of the embodiments of inventive aspect, its operating advantages and the specific aspects attained by its uses, reference should be made to the accompanying drawings and descriptive matter in which there are illustrated embodiments of the inventive aspects.

BRIEF DESCRIPTION OF THE DRAWINGS

To further clarify various aspects of example embodiments, a description of the inventive aspect will be rendered by reference to specific embodiments thereof which are illustrated in the drawing. It is appreciated that the drawing depicts only illustrated embodiments of the inventive aspect and are therefore not to be considered limiting of its scope. The inventive aspects will be described and explained with additional specificity and detail through the use of the accompanying drawing in which.

DETAIL DESCRIPTION

Figure 1:
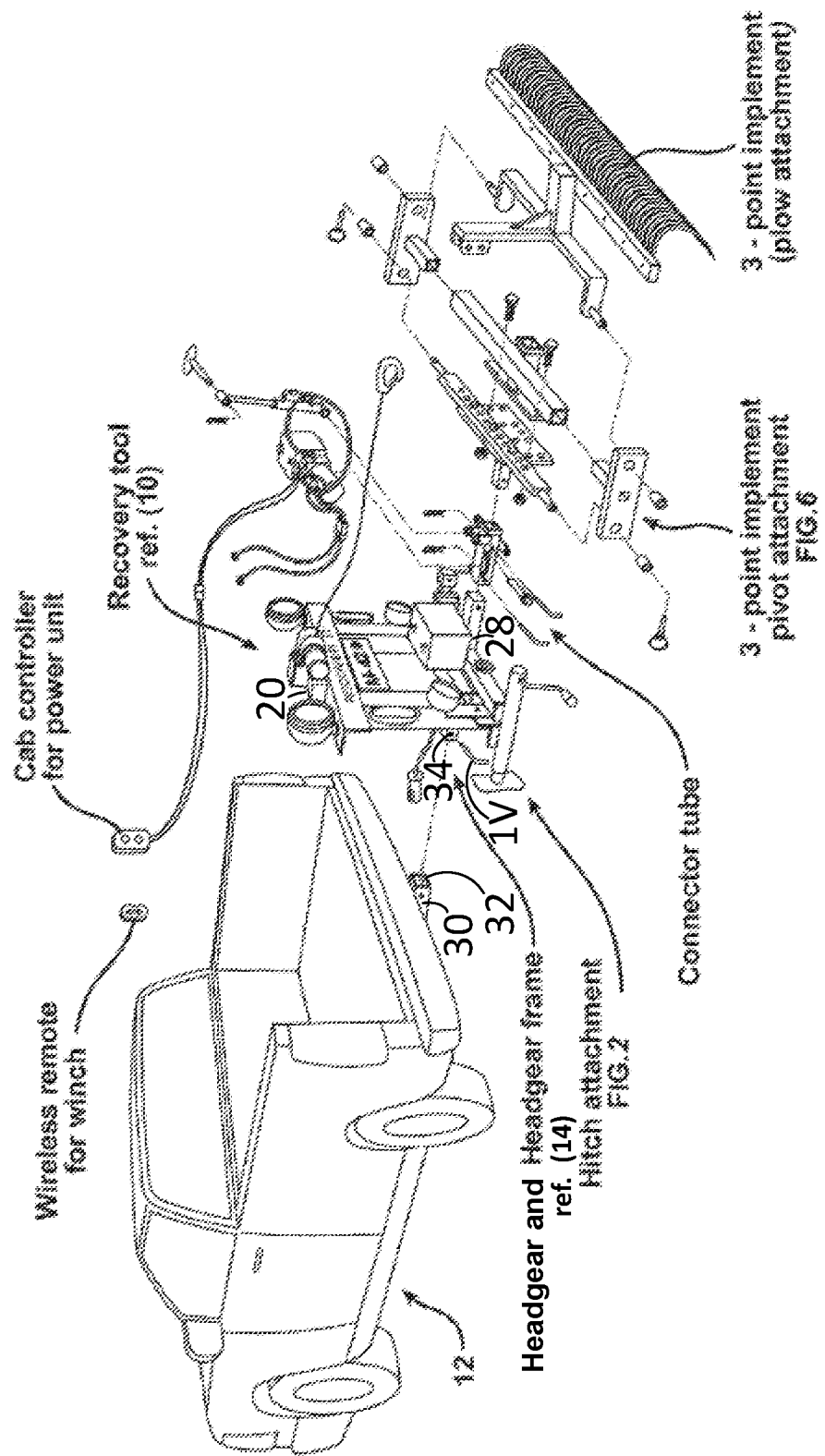
FIG. 1 shows a prospective view of a recovery tool configured to attach to a vehicle and a snow plow according to an example embodiment.

Those skilled in the art can understand that many changes can be made in the embodiments described, while still obtaining beneficial results of the present inventive aspect. It will also be apparent that some of the desired benefits of the present inventive aspect can be obtained by selecting some of the features of the inventive aspect while not utilizing other features. Accordingly, those working in the relevant art will recognize that many adaptations and modification to the present inventive aspect can be made and may be desired in certain circumstances, and are part of the present inventive aspect. Thus, the following description is provided as illustrative of the principle of the present inventive aspect.

Inventive aspects may be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, some dimensions are exaggerated for clarity.

It will be understood that when an element is referred to as being "connected" or "coupled" to another element, it can be directly connected or coupled to the other element or intervening elements may be present.

The terminology used herein is for the purpose of describing particular embodiments only and is not intended to be limiting of example embodiments of the inventive concepts. As used herein, the singular forms "a," "an" and "the" are intended to include the plural forms as well, unless the context clearly indicates otherwise it will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Embodiments of the present inventive aspect provide a recovery tool attachable to the back or front a vehicle with a receiver hitch class III and up, and useful to perform lift, drag, tow and pull using the vehicle. The vehicle may be hummer truck, pickup truck, trailer, tractor, all-terrain vehicles, small maintenance vehicles and the like. Accordingly, the specific embodiments discussed herein are merely illustrative of specific manners in which to make and use this inventive aspect, and are not intended to represent an exhaustive list of all possible structure and processes of the present inventive aspect.

Embodiments of the recovery tool are shown in the figures, and discussed below. While the structure and processes have been described with a certain degree of particularity, it is to be noted that many modifications may be made in the details of the structure and processes without departing from the spirit and scope of this disclosure. It is understood that the structure and processes are not limited to the embodiments set forth herein for purposes of exemplification.

Aspects of the present inventive subject matter are described with reference to the figures.

TABLE 1

| Reference sign(s) | Representation/description for reference sign(s) |
| --- | --- |
| 1A | M-420 Tall Head Gear Design |
| 2A | M-450 Low Profile Head Gear Design |
| 3A | M-460 Straight Tube Design |
| 1B | 3" Work Light |
| 1C | 2500 lbs. Jack Leg |
| 1D | Hitch Attachment Bar ref. (28) |
| 1E | 3-Point Connector Side Plates |
| 1F | 3-Point Bar |
| 1G | Connector Tube (FIG. 5) |
| 1H | 3-Point Adjustable Adaptor Plate |
| 1I | Adaptor Tube |
| 1J | Battery Box |
| 1K | 4500 lbs. Electric Winch |
| 1L | Reverse Lights |
| 1M | ¾ Bushing |
| 1N | ¾ × 1" ½ Bolt |
| 1O | ¾ Lock Nut |
| 1P | D.O.T. Right turn and Parking Light |
| 1Q | D.O.T. Left turn and Parking Light |
| 1R | 7-Way Male Harness and Junction Box |
| 1S | D-Ring |
| 1T | ⅝ × 2" Hex Bolt |
| 1U | Safety Clip |
| 1V | ⅝ Hitch Pin |
| 1X | ¼ × 6" Safety Pin |
| 1Y | Snap Ring Safety Pin |
| 1Z | 12 Volt Battery |
| 1AA | Hydraulic Ram |
| 1BB | Electric Over Hydraulic Power Unit Double Acting |
| 1CC | 12 Volt Battery Connectors |
| 1DD | 2 Gauge Black Battery Cable |
| 1EE | 2 Gauge Red Battery Cable |
| 1FF | 12" Hydraulic Hose |
| 1GG | 24" Hydraulic Hose |
| 1HH | 90 Degree Hydraulic Fitting |
| 1II | 90 Degree Hydraulic Fitting |
| 1JJ | ⅜ × 1" Bolt |
| 1KK | ⅜ Lock Washer |
| 1LL | ¾ Fender Washer |
| 1MM | ¼ × 1" Bolt |

TABLE 1-continued

| Reference sign(s) | Representation/description for reference sign(s) |
| --- | --- |
| 1NN | ¼ Lock Nut |
| 1XA | ¾ Pin with Handle |
| 1XR | Push Pin |
| 1XT | Recover It Decal |
| 142 | M-420 Decal |
| 145 | M-450 Decal |
| 160 | M-460 Decal |
| 1RR | Loom Clips |
| 1XX | Junction Box |
| 1TT | ¼ Lock Washer |

Figure 2:
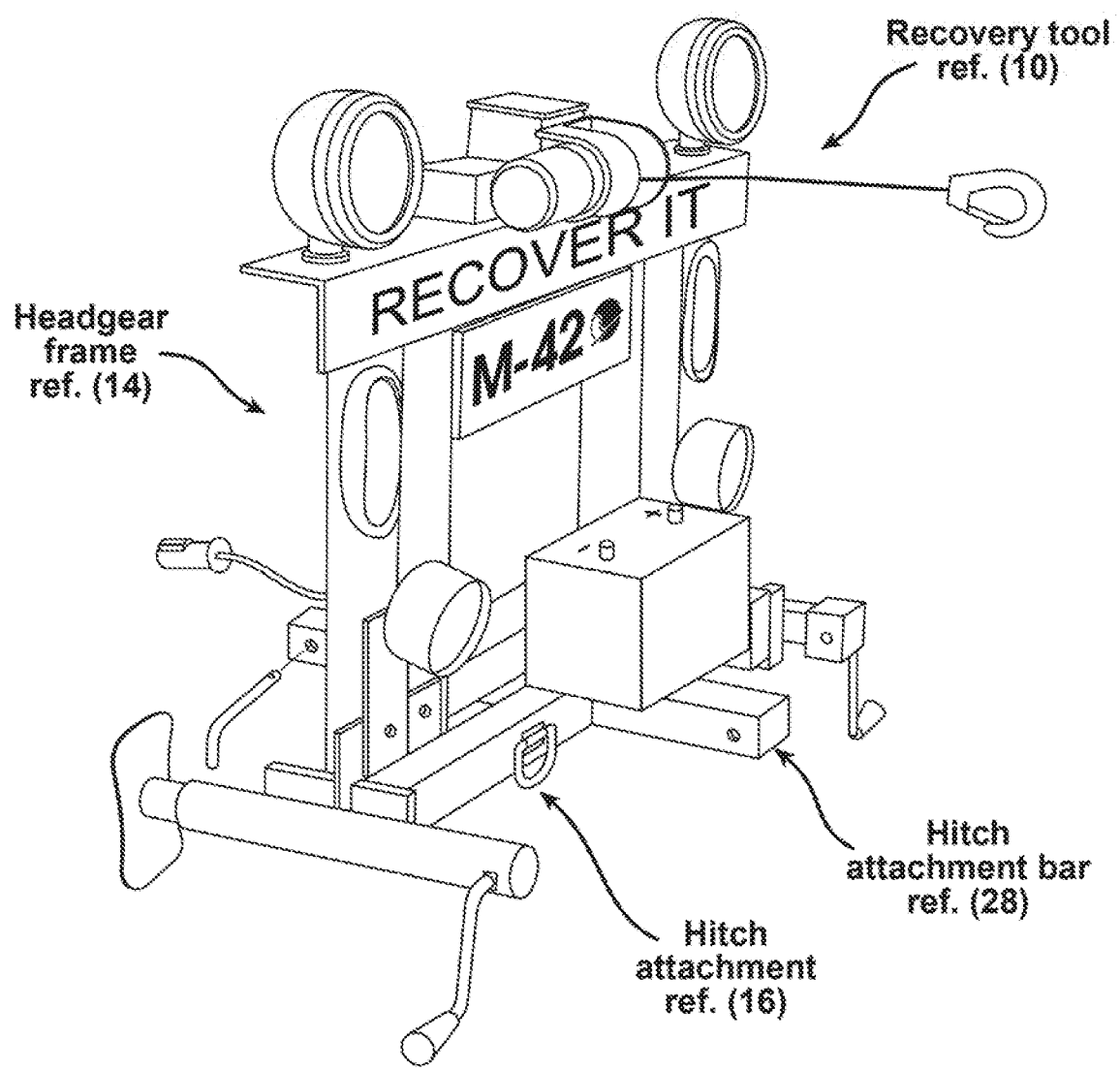
FIG. 2 shows hitch attachment & headgear frame of the recovery tool according to an example embodiment.
Figure 3:
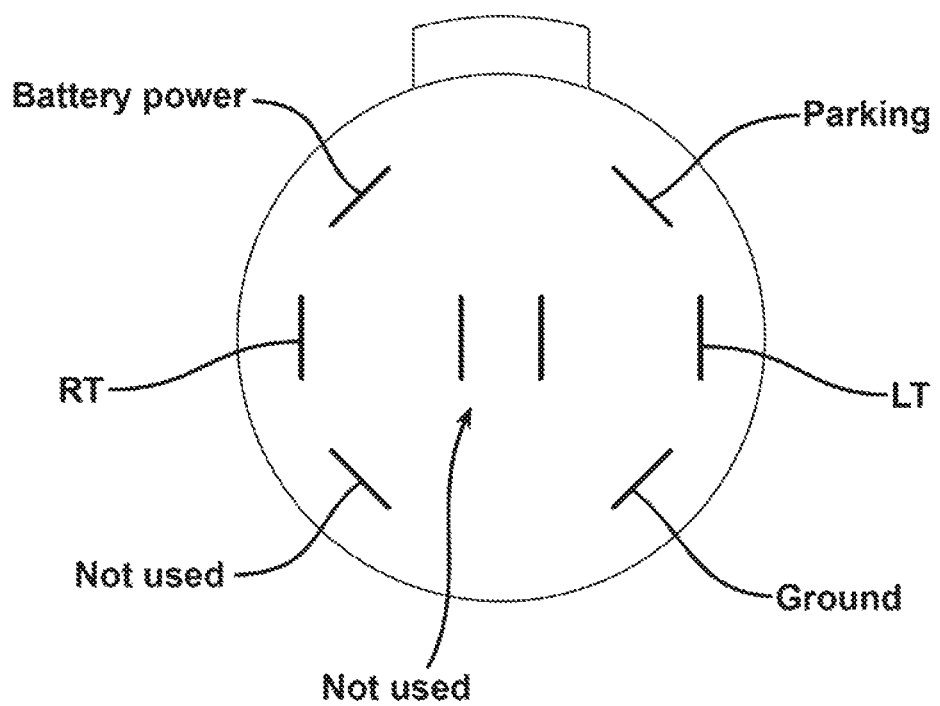
FIG. 3 shows 7-way female wiring plug according to an example embodiment.

In an example embodiment, FIGS. 1-2 show a recovery tool IO configured to attach to the back or front of a vehicle with a receiver hitch class III and up. The recovery tool 10 once mounted to a vehicle 12 is useful to perform lift, drag, tow and pull. The vehicle 12 can be but not limited to a hummer truck, pickup truck, trailer, tractor, all-terrain vehicles, small maintenance vehicles and the like. The recovery tool 10 generally comprises of a head gear 14 and a hitch attachment 16. The head gear 14 is attached to the hitch attachment 16 and is present above the hitch attachment 16. The head gear 14 is useful for mounting accessories such as lighting system required for the operation of the recovery tool 10. The hitch attachment 16 allows attachment of the recovery tool 10 to the vehicle 12 and also providing point of attachment for various accessory tools necessary to perform lift, drag, tow and pull using the vehicle 12. The head gear 14 may be attached to the hitch attachment 16 by suitable means of attachment including but not limited to bolts, welding, combination of bolts and welding. For example, the head gear 14 and hitch attachment 16 are joined to each other by both bolting and welding for extra strength. The recovery tool 10 further includes a winch IK, a wireless controller (not shown), and a control box 20 for wireless controller. The winch IK is preferably 4500 lbs. winch. The winch IK is attached to the head gear 14. The control box 20 for the wireless controller is also attached on the head gear 14. The winch IK is operationally connected to the wireless controller to allow an operator to remotely control the operation of the winch IK.

The head gear 14 is made up of four pieces, two vertical uprights 22a, 22b, an angle 24 connected to the top of the two vertical uprights 22a, 22b, and a cross tube 26 connected to the bottom of the two vertical uprights 22a, 22b. The two vertical uprights 22a, 22b, angle 24 and cross tube 26 are connected such that they are placed square and plumb from one another. The angle 24 provides reinforcement to the two vertical uprights 22a, 22b while the cross tube 26 provides additional strength to the two vertical uprights 22a, 22b for providing overall strength to the head gear 14. The two vertical uprights 22a, 22b are further connected at their bottom to the hitch attachment 16 thereby connecting the head gear 14 to the hitch attachment 16. The two vertical uprights 22a, 22b are preferably connected to the hitch attachment 16 by bolts and welding. The two vertical uprights 22a, 22b are made from box tubing. Preferably the box tubing is ¼"×4"×4" box tubing. The winch IK is preferably mounted to the angle 24 connected to the top of the two vertical uprights 22a, 22b.

Figure 4:
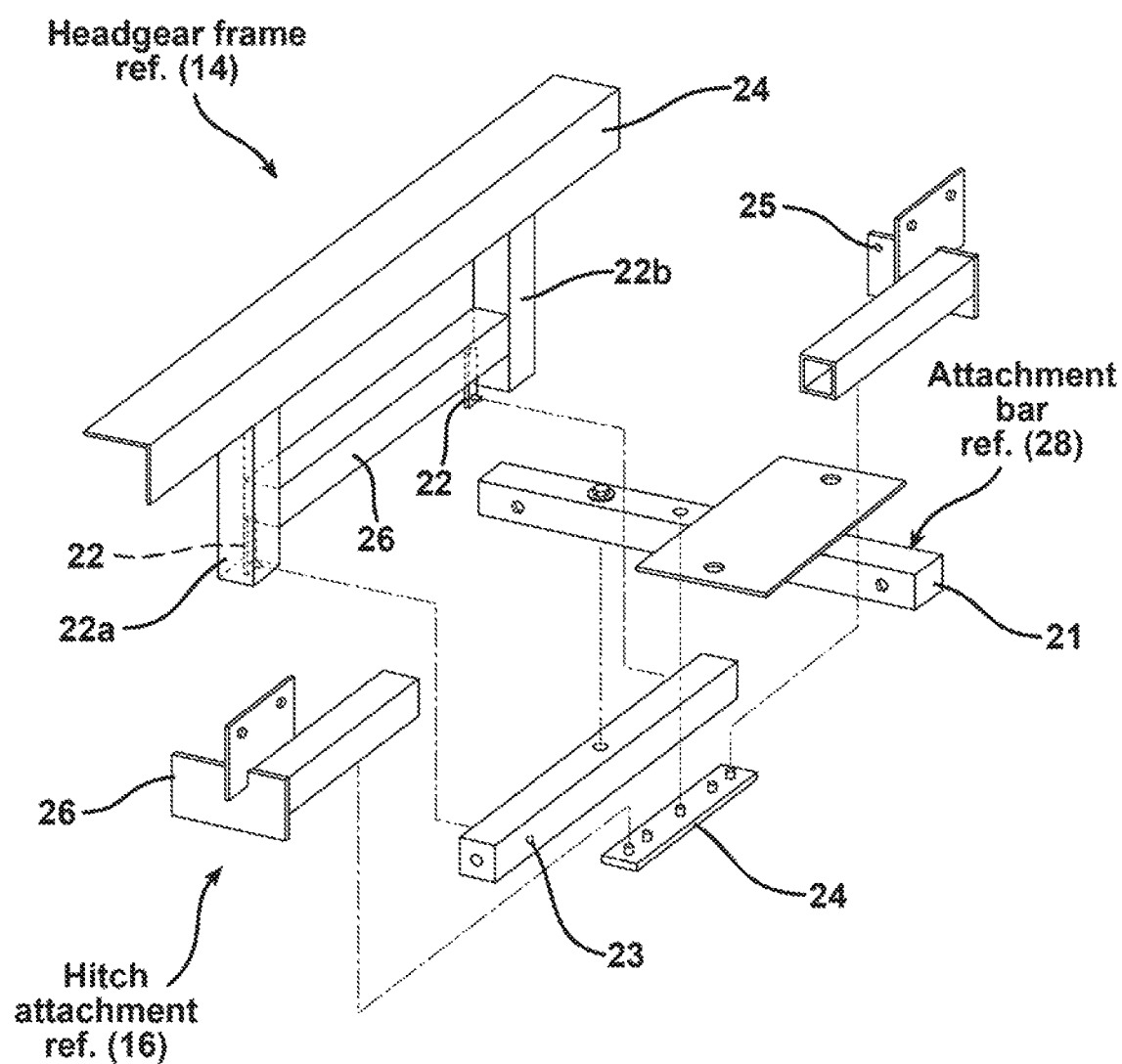
FIG. 4 shows hitch attachment headgear frame (exploded view) according to an example embodiment.

FIG. 1 depicts a side elevation view of a recovery tool 10 releasably coupled between a front or rear of a vehicle 12 and a 3-point implement pivot attachment (FIG. 6), according to an example embodiment. The recovery tool comprises a head gear 14 and a hitch attachment 16, The head gear is mechanically and physically coupled to said hitch attachment, the hitch attachment comprising a hitch attachment bar 28. The hitch attachment bar 28 is attached to the vehicle 12 equipped with receiver hitch class III and up. The hitch attachment bar 28 is the part of the recovery tool 10 which attaches the recovery tool 10 to the vehicle 12, since most vehicles may be equipped with a vehicle hitch 30, for towing. The vehicle hitch 30 may have a male end 32 for coupling with a female end 34 of the hitch attachment bar 28. The hitch attachment bar 28 preferably fits into vehicle hitch 30. The inner side of the hitch attachment bar 28 slides into the vehicle hitch and is pinned on to the vehicle hitch using a ⅝"×4½" hitch pin 1V with clip. The other end 21 of the hitch attachment bar 28 is configured to provide attachment point for attaching accessory attachments necessary for lift, drag, tow and pull, depicted in FIG. 4 and described herein. Once the recovery tool 10 is mounted and safety pinned to a vehicle it can be used to perform the lift, drag, tow and pull using the vehicle 12. The hitch attachment may further include a rear support bar, rear support brackets, left support bracket, right support bracket and a lower support bracket. The left support bracket and right support bracket are useful for attaching hydraulic unit and lights. The rear support bar is placed square to the hitch attachment bar 28. The hitch attachment bar 28 is connected by bolts threaded into the rear support bar. The rear support brackets are bolted to the rear support bar and are welded to the two vertical uprights 22a, 22b of the head gear 14 to thereby connect the hitch attachment 16 to the head gear 14. The hitch attachment bar 28 is preferably made from the mild steel. The rear support bar is preferably made from mild steel, solid metal bar. The hitch attachment bar 28 is preferably 2"×2" solid square bar of 24 inches length. The left support bracket and right support bracket are placed square to the rear support bar. The left support bracket and right support bracket are made from square box tubing and mild steel flat plate which is welded to be one piece. Each piece is placed square and plumb from each other. Each of these pieces are bolted and welded to the two vertical uprights 22a, 22b of the head gear 14. The lower support bracket is bolted to the left support bracket and right support bracket and to the hitch attachment bar 28. For manufacturing the left support bracket and right support bracket, preferably ¼"×2"×2" square box tubing and ¼"×4" and ¼" and 2" mild steel flat plate are used. The bolts used in the hitch attachment 16 are preferably ½" bolts grade five.

FIGS. 1-6 show various embodiments of the present inventive aspect. the recovery tool 10 further includes a lighting system which has different types of lights for supporting use of the recovery tool 10 in performing various types of activities. All the lights are positioned to be visible when the recovery tool 10 is attached to any vehicle and plugged into existing vehicle wiring which is located on the back of a vehicle next to vehicle's receiver hitch. All lights are preferred to be facing out towards and visible to anything that is behind the recovery tool 10. The recovery tool 10 has halogen lights to illuminate only when the vehicle is put into reverse. The halogen lights are preferably connected to angle present at the top of the head gear 14, by bolts. The halogen lights are on adjustable bases, preferred to be facing straight back and a little down. The recovery tool 10 preferably has two halogen lights. The halogen lights are preferably 12 volts spot lights which are great for lighting a wide range when backing up the vehicle with the recovery tool 10 mounted thereon. The recovery tool 10 further includes lights including but not limited to left turn signal, right turn signal, parking lights, stop lights, tail lights and brake lights.

The left turn signal, right turn signal, parking lights, stop lights, tail lights are preferably mounted to the two vertical uprights 22a, 22b of the head gear 14. The left turn signal, right turn signal, parking lights, stop lights, tail lights are rubber mounted and fit into a steel bracket that is then bolted into the vertical uprights 22a, 22b using a self-taping bolt. The function of these lights is to give extra vehicle signaling, running lights, while the additional brake lights also illuminate the recovery in the dark. The recovery tool 10 includes work lights which are preferably two in number and are 12 volt powered. The work lights preferably face straight back, very little adjustment. The work lights get their power from the self-contained battery mounted on the recovery tool 10. The two work lights can be used at any time operating from a toggle switch that is mounted to the plastic electrical junction box, while the electrical junction box is mounted on lower cross tube of the head gear 14. The work lights work great when jump starting, hooking up attachments and any job that prefers light for example, in night. Various components of light assembly are preferably mounted to the head gear 14. The left turn signal, right turn signal and parking light brackets are preferably mount to the box tubing forming the two vertical uprights 22a, 22b of the head gear 14. The insulated wiring box is preferably mounted to the lower cross tube attached on the inside of the two vertical uprights 22a, 22b of the head gear 14. The angle attached on the very top of the vertical uprights 22a, 22b of the head gear 14, holds the reverse lights.

Figure 7:
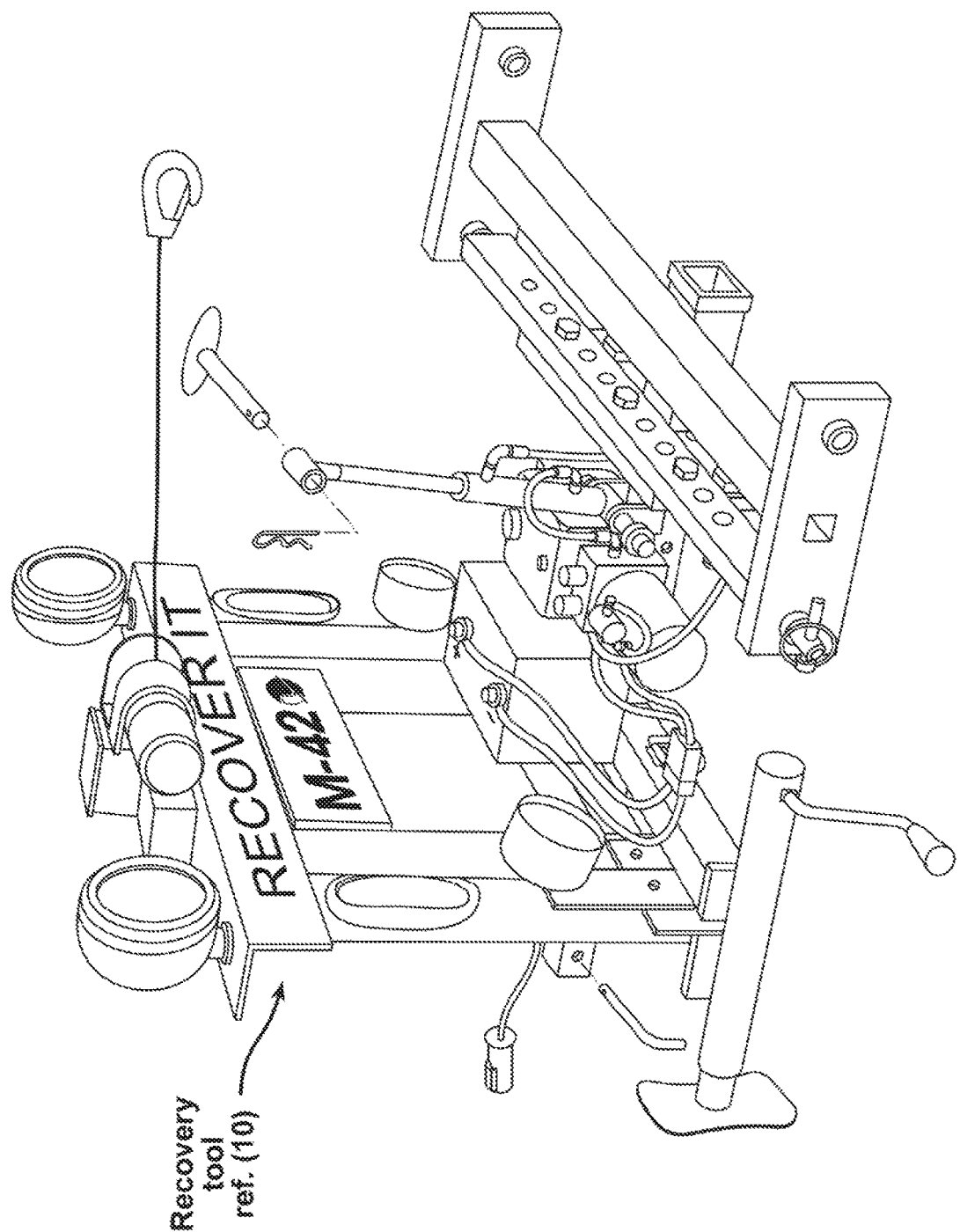
FIG. 7 shows a perspective view of the recovery tool including a hydraulic unit according to an example embodiment.
Figure 8:
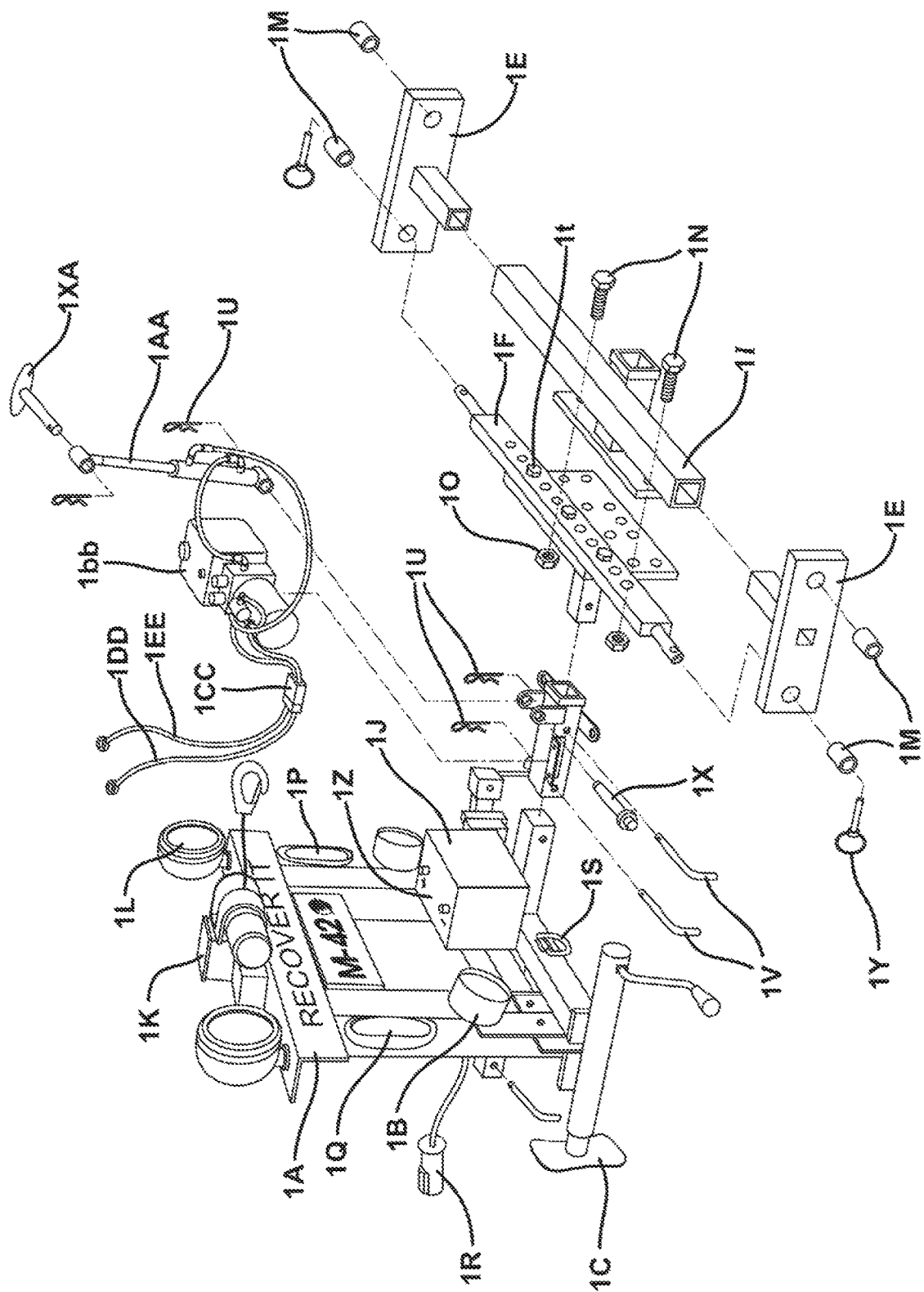
FIG. 8 shows an exploded view of the recovery tool including a hydraulic unit according to an example embodiment.
Figure 9:
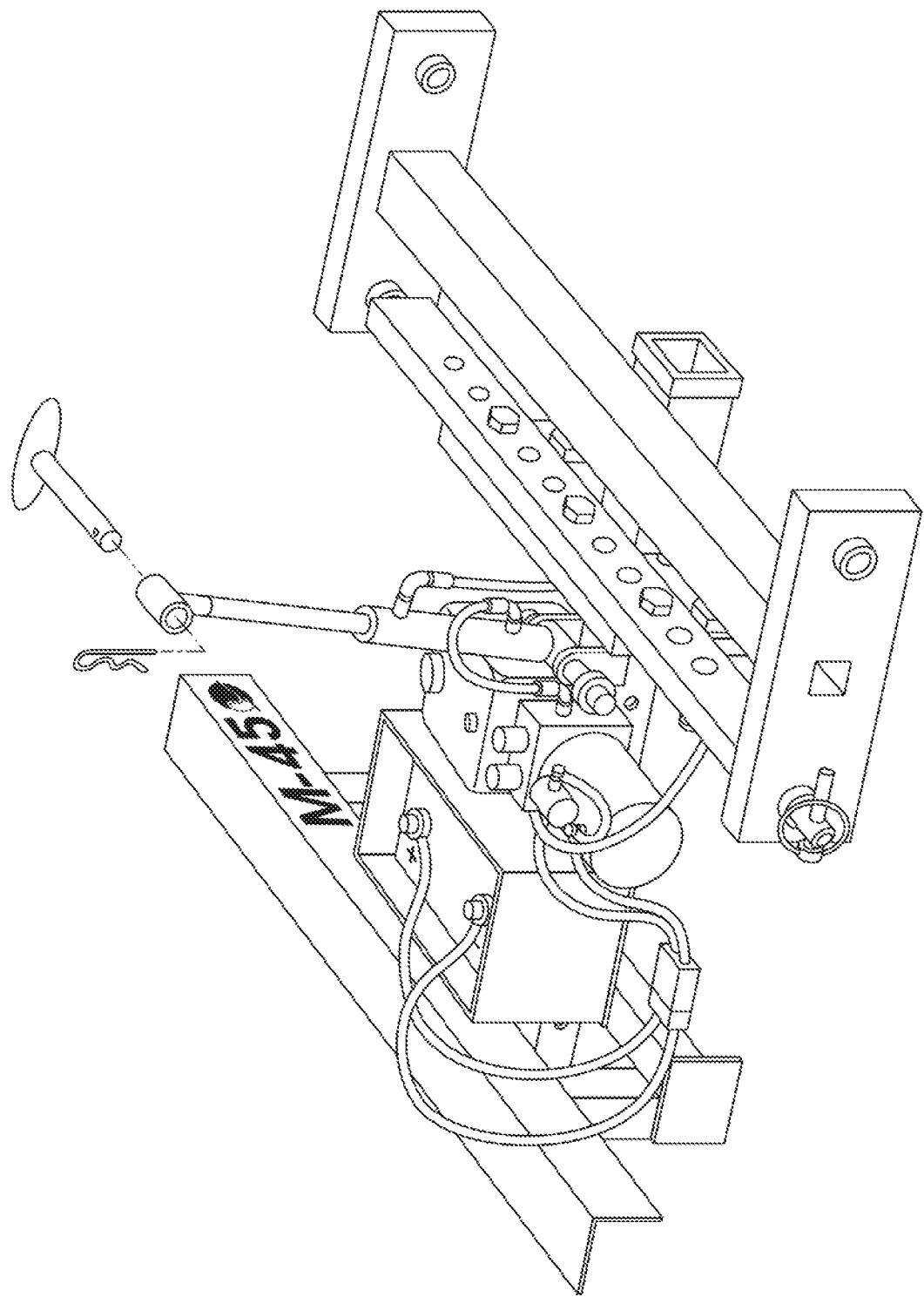
FIG. 9 shows a perspective view of a low profile headgear according to an example embodiment.
Figure 10:
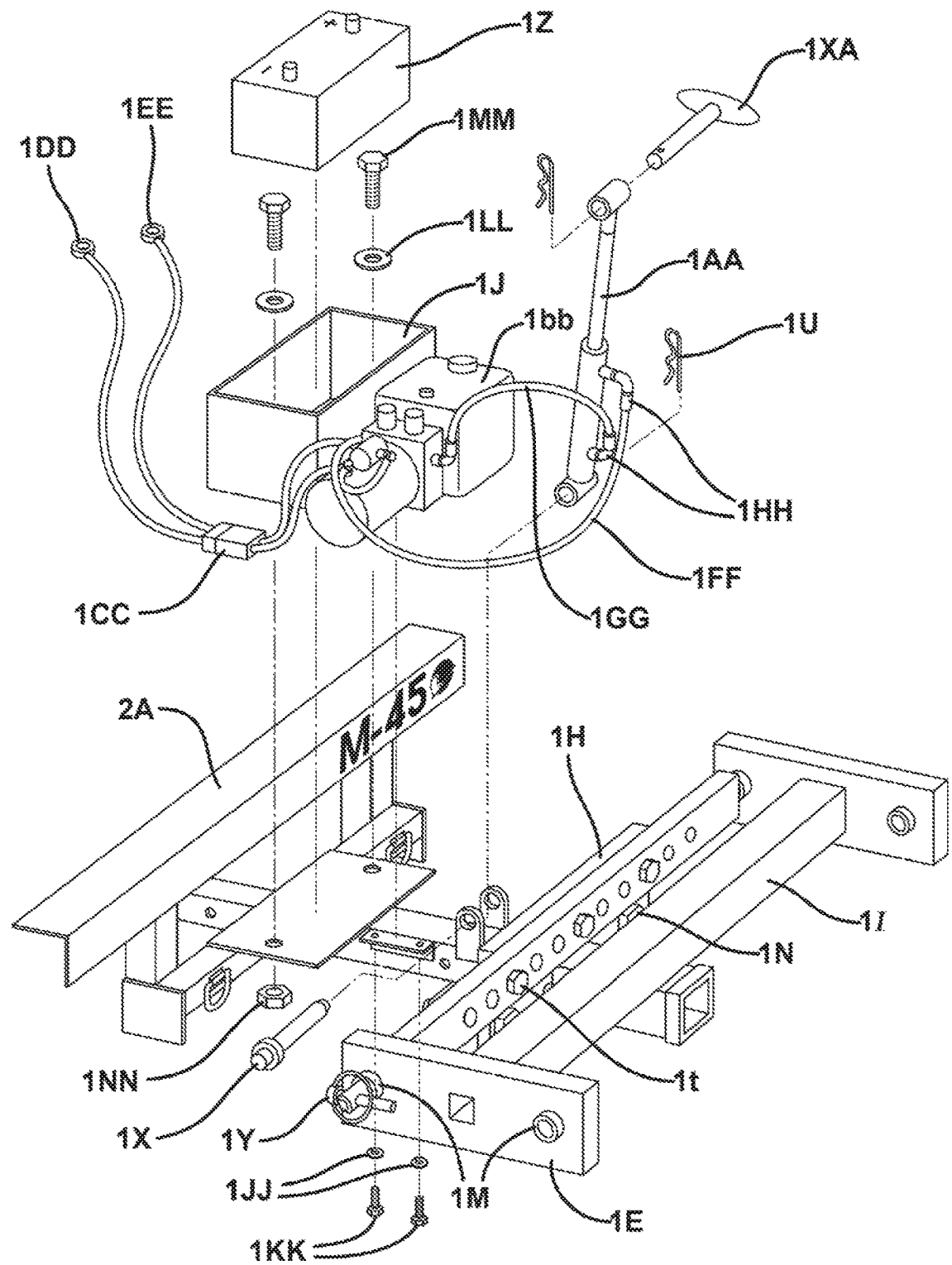
FIG. 10 shows an exploded view of a low profile headgear according to an example embodiment.
Figure 11:
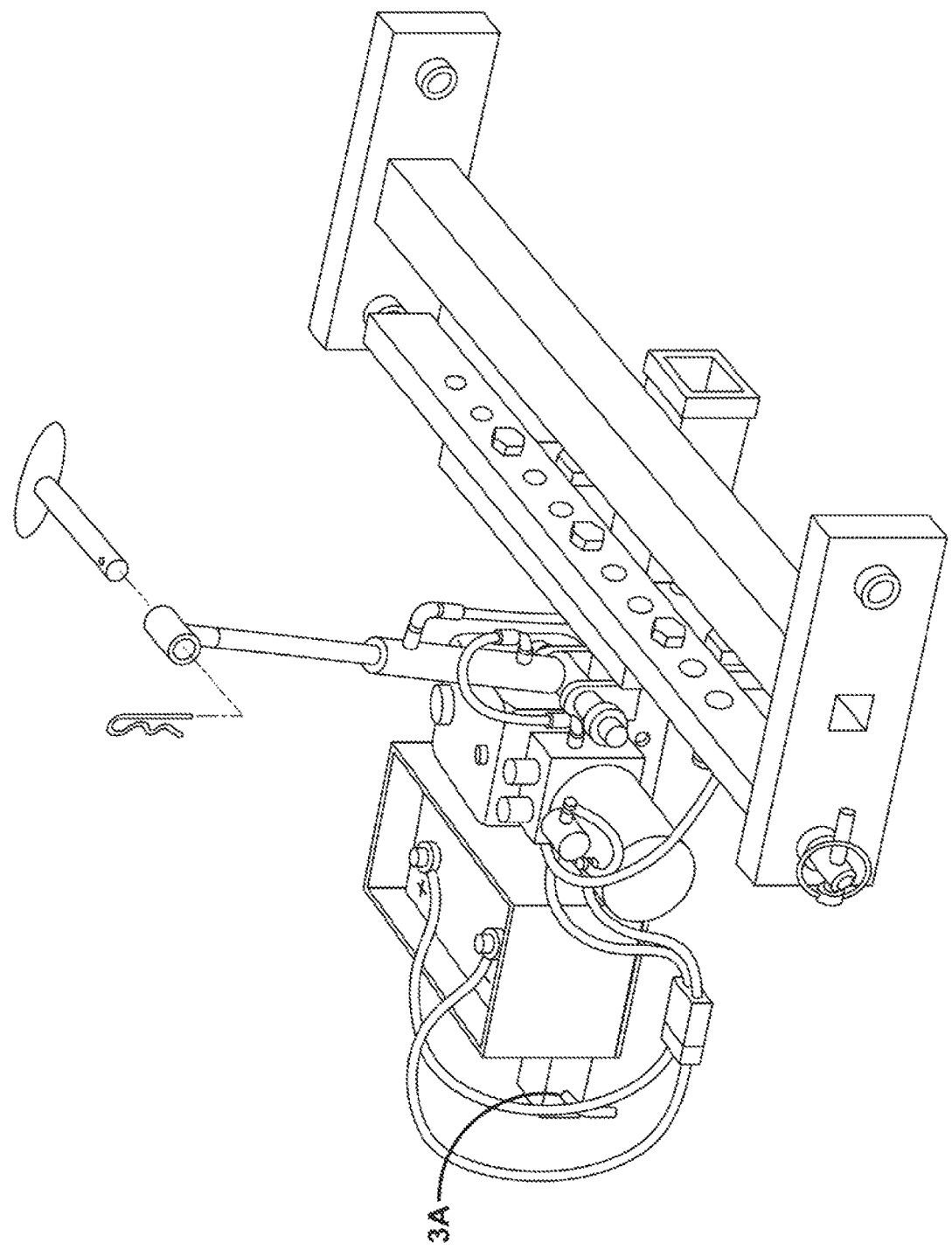
FIG. 11 shows straight tube according to an example embodiment.
Figure 12:
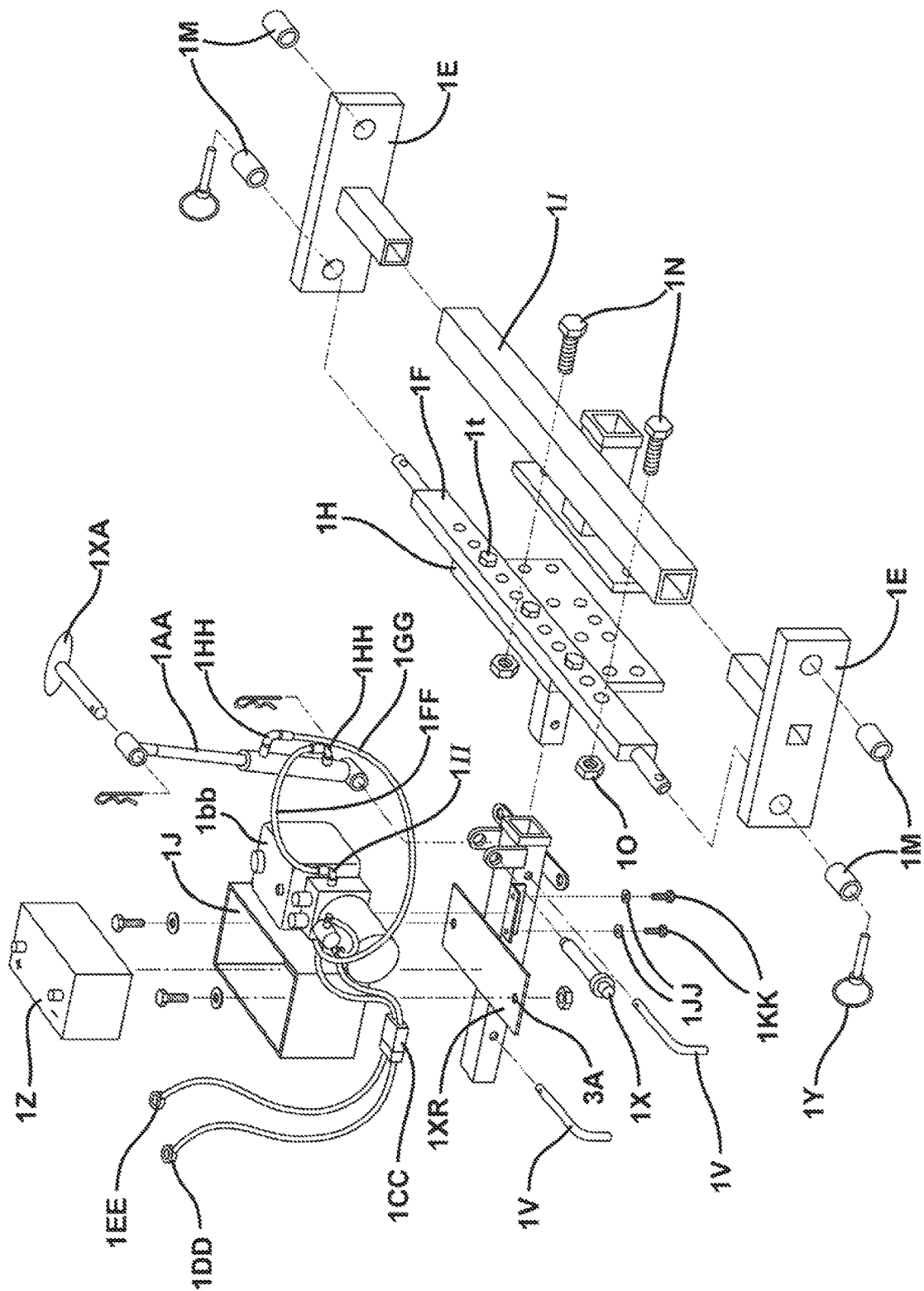
FIG. 12 shows an exploded view of the straight tube according to an example embodiment.
Figure 13:
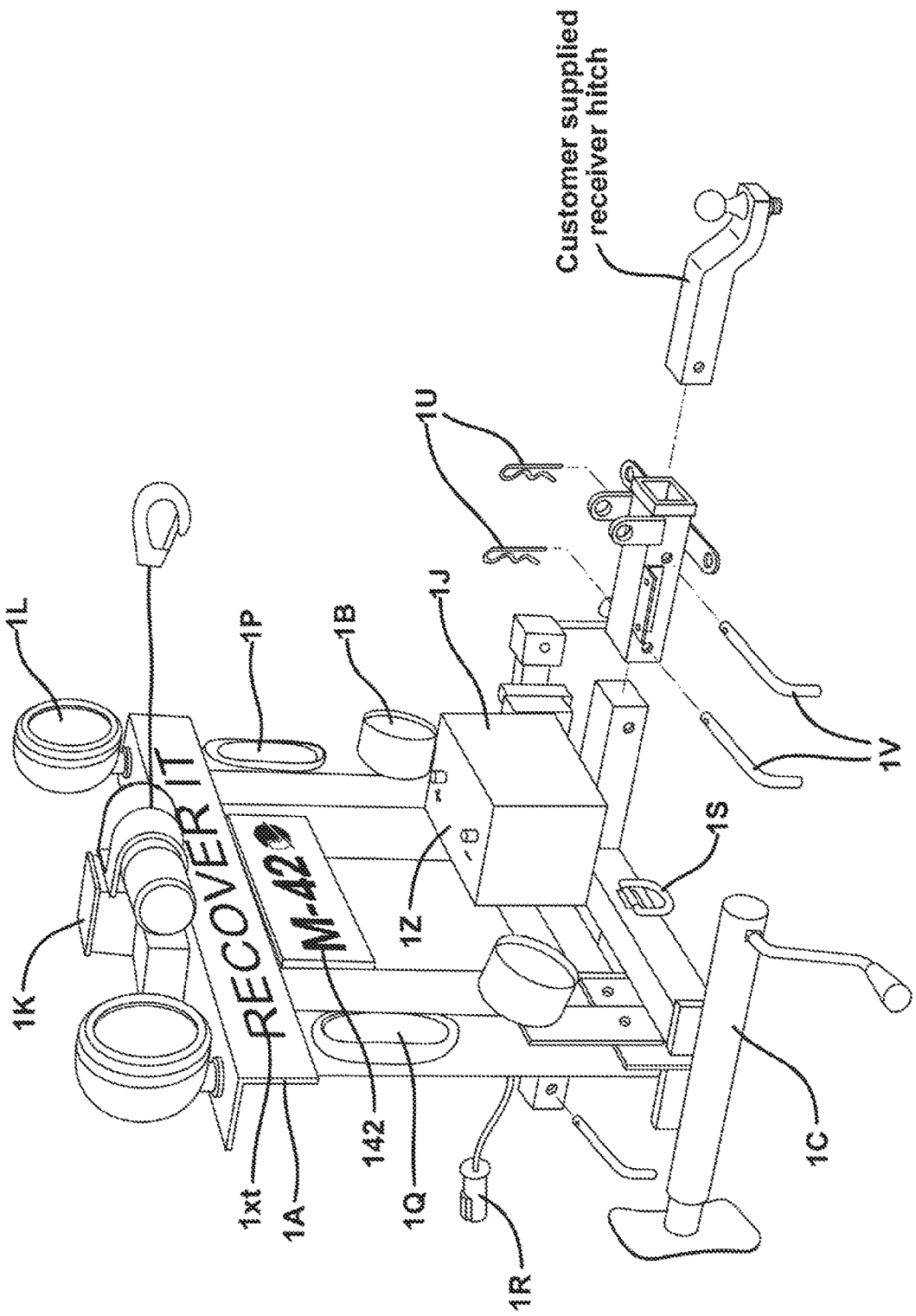
FIG. 13 shows an exploded view of a tall headgear for towing & recovery applications (with receiver hitch attachment) according to an example embodiment.
Figure 14:
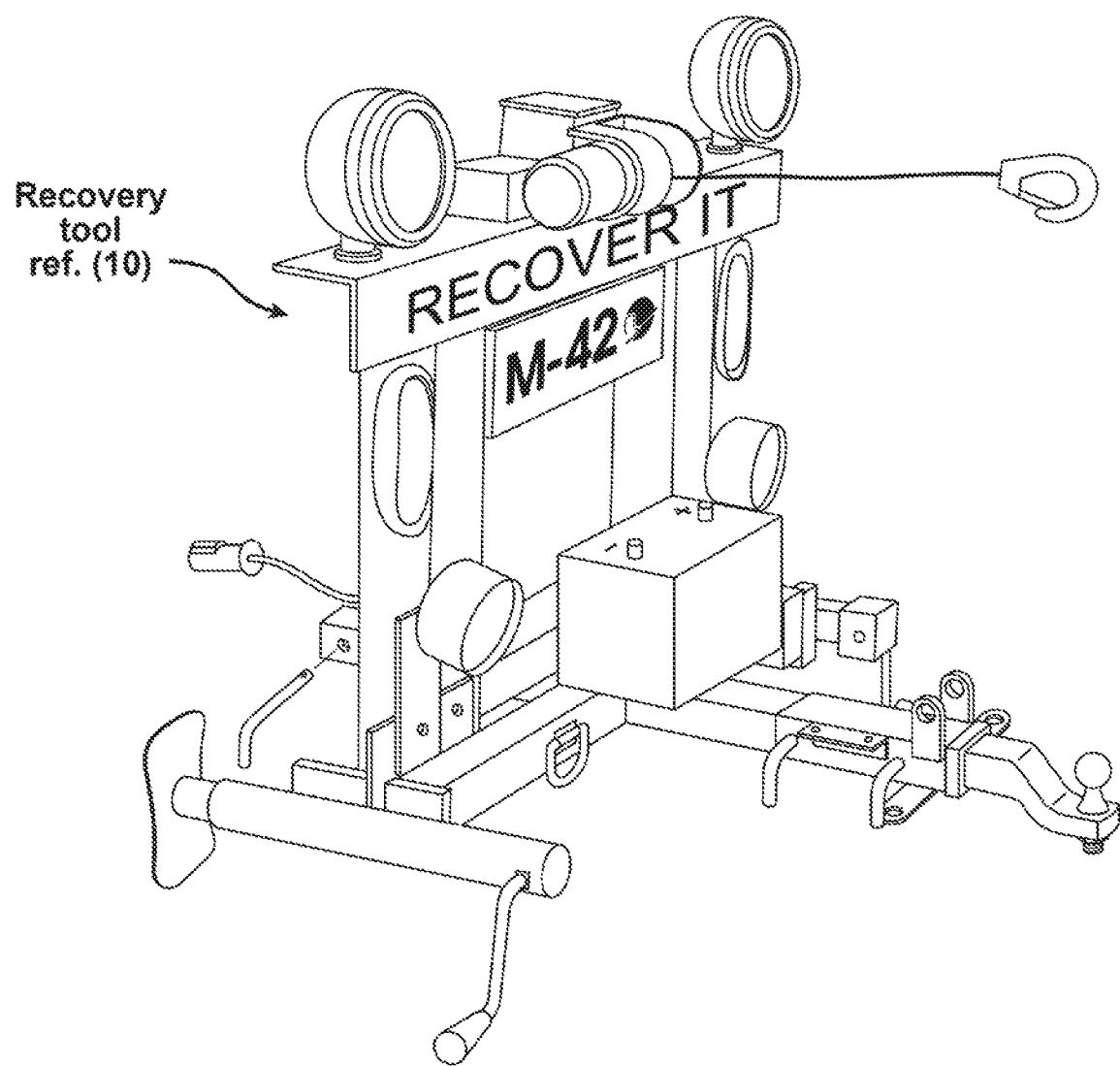
FIG. 14 shows the recovery tool for towing & recovery applications (with receiver hitch attachment) according to an example embodiment.

FIGS. 7-8 show the recovery tool 10 further including a hydraulic unit which has a hydraulic ram that operates the double acting ram for three point attachments. The recovery tool 10 includes a power source which supply power for the operation of the recovery tool. The power source is preferably a self-contained battery. To receive power from other power source, the recovery tool 10 further includes male wiring plug configured to be plugged into vehicle's 7-way female wiring plug mounted at the rear of each vehicle. The self-contained battery feeds power to both work lights, powers the control box for wireless communication, also feeds power with in line disconnects to self-contained power unit that runs the hydraulic ram. The vehicle wiring puts out between 12 & 14 volts to rear 7-way female plug. The recovery tool 10 picks up its power through the 7-way connection female on vehicle side to the male 7-way on the recovery tool side. Through the 7-way plug the recovery tool 10 gets power for the left turn signal, right turn signal, parking lights, stop lights, tails lights and 12 volt charging power while vehicle is running and reverse lighting that illuminates both halogen lights when vehicle is put in to reverse position. Power to these lights is activated when the vehicle lights are activated.

A handheld wireless controller can be used for controlling the operation of the recovery tool 10 of the present inventive aspect. The wireless controller is made out of a plastic material and has a built in battery and three small touch pads, one touch pad to turn it on, other two touch pads control in and out of 12 volt winch. The wireless controller is small enough to fit in your pocket or on the key ring of the truck keys. The winch used with the recovery tool 10 of the present inventive aspect may be the winch available in the market and supplied with a wireless controller and control box. For example, the traveler's 4500 lbs UTV winch can be used with the recovery tool 10 of the present inventive aspect. The traveler's 4500 lbs UTV winch is provided with wireless controller and control box. The harness kit is available in market complete with the 4500 lbs UTV winch. Installation on the recovery tool 10 is easy. One end of the wires attaches to the winch and other end of the wire goes to self-contained battery mounted on the hitch attachment 16 of the recovery tool 10. The communication between the controller and control box has a range to be over fifty feet away from one another. Typically, the recovery tool 10 of the present inventive aspect will always stay hooked to vehicle and but the operator can use the recovery tool 10 on the inside and outside of a vehicle. The recovery tool 10 can be operated from a wireless controller which runs the operation of the traveler's UTV winch. The winch is mounted to the head gear 14. The wireless controller winch can be used in and out of a vehicle to perform dragging, pulling and towing. The winch gets its power from the self-contained 12 volt battery mounted to the hitch attachment 16 of the recovery tool 10. The recovery tool 10 also has a wired control cord that operates electric self-contained power unit when the three-point accessory attachment is added to the hitch attachment bar 28 of the recovery tool 10. If this attachment is added to the recovery tool 10, operator will feed harness into cab either through sliding rear window or through passenger side window of their vehicle to operate while dragging, pulling with the three point attachments. There is a kit available to convert this accessory to wireless controller, could be an upgrade to the end user if necessary.

In an example embodiment, the three point implements may be adjusted in angular position by using relocking pin.

Preferably, all the parts of the head gear, hitch attachment, control box for wireless controller of the recovery tool of the present inventive aspect are made from mild steel metal. Alternatively, all the parts of the head gear, hitch attachment, control box for wireless controller can be made from other sturdy material including but not limited to stainless steel, and aluminum. The use of stainless steel or aluminum for manufacturing the recovery tool of the present inventive aspect minimizes painting or galvanizing dipping of the recovery tool. As also discussed above, it is preferred that the different parts of the recovery tools described below once connected to each other by suitable means of attachment such as bolts, are further connected to each other by welding for extra strength and making the recovery tool a bolted and welded one-piece unit. The recovery tool once manufactured can be sand blasted free of all mill scale and etched primed with self-etching primer and painted for example, using an aluminum paint finish.

FIGS. 6-14 show the recovery tool 10 according to another example embodiment. The recovery tool 10 provide interconnect and control between a vehicle 12 and various accessory attachments for lifting, dragging, towing and pulling for performing various types of activities including but not limited to perform dragging snow or dirt, road cleaning, driveway scraping, towing and recovery, search and rescue operation, pull boat docks and launch boats, dragging logs out of woods or dragging broken articles and jump start truck or car. The recovery tool may be attached to vehicle which may include but not limited to hummer truck, pickup truck, trailer, tractor, all-terrain vehicles, small maintenance vehicles and the like All the necessary accessory attachments for these activities are mounted off of the hitch attachment bar. To use recovery tool of the present inventive aspect for cleaning drive ways, scraping ice and dirt, driveway cleaning and roadway cleaning, the hitch attachment bar accepts the accessory attachment that adapts to three-point tractor implements attachments to the recovery tool. The three-point tractor implement attachment allows the recovery tool to attach to the three-point tractor back drag blades which is useful to drag snow or dirt. The hydraulic accessory attachment is removably connected to the hitch attachment bar of the recovery tool preferably by using a ½" pin and 4.5" long safety pin. The hydraulic accessory attachment contains a double acting hydraulic reservoir and ram. The hydraulic unit operates from a pendant controller which plugs into the power unit electrical plug and feeds into vehicle to operate the back drag blade for snow dirt and ice. The controller operates the hydraulic ram causing the back drag blade to lift and lower with down pressure great for cleaning drive ways, scraping ice and dirt. Similarly, the recovery tool can be used, where the hitch attachment bar of the recovery tool holds hydraulic accessory attachment, three-point mounting bracket and three point back drag blade. The functional unit thus formed gets its power from its self-contained 12-volt battery which allows lifting and lowering the recovery tool to scrapes road/driveway clean free from snow, ice and/or dirt.

The recovery tool can be efficiently used for recovery of stuck vehicles, drag logs, broken equipment, docks etc. by performing towing, pulling, dragging and lifting. The recovery process can be performed while using the work lights and reverse lights of the recovery tool for lighting and also the 4500 lbs winch with wireless controller. The halogen flood lights and work lights of the recovery tool could be used for search and rescue purposes by providing search lightning. The halogen flood lights and the work lights can be upgraded to more expensive lights to use high intensity light, if needed for a search and rescue activity. The recovery tool could be attached to the emergency vehicles and used in search of people in the water or over an embankment while using 4500 lbs winch for rescue purpose. The 4500 lbs winch is medium size and the recovery tool could easily be upgraded to heavier bigger winch and extreme bright light, strobes or flashing lights to be an ultimate search and rescue safety device. The winch comes with 50 feet of rescue cable and could always be extended with another cable or rope for water emergency. Further, the recovery tool of the present inventive aspect mounted on the front or rear of any truck equipment with a receiver hitch class III and up can easily pull boat docks and launch boats, tow horse trailers, utility trailers basically most anything that takes a ball. For removing docks up and out of the water operator would use the wireless remote for controllably winching docks to shore. The 4500 lbs pull capacity winch with 50 ft. aircraft cable is specifically useful for this purpose. In most cases the operator would back the vehicle up close to the dock, put the vehicle in park, get out and hook cable to dock lifting eye. After the cable is attached, the operator would use wireless controller for the winch and recovery docks up and out of water. For towing boats, the unit has a receiver tube that adapts to the hitch attachment bar. This attachment tube allows the end user to install preferred draw bar with ball that fits their trailer. 1⅞", 2" and 2 5/16" are the three sizes which are adapted to the recovery tool of the present inventive aspect. For dragging logs out of woods or dragging broken articles, the recovery tool is attached to the vehicle; the winch mounted to the head gear of the recovery tool is then used to drag the logs and broken article out of hard reach spots. Once the logs are pulled to road ways or clearings, the recovery tool has the capability to drag logs using operator's personal vehicle. Rigging chains (not supplied) could be rigged to logs and towed using the safety d-rings that are mounted to lower hitch attachment. Also, when the recovery tool is mounted to the truck, the recovery tool can be used to attach a trailer to its receiver tube over the hitch attachment bar. Allowing trailers to be mounted to it at varied sizes allows the recovery tool to drag logs on to trailers or any broken down device up to 4500 lbs. Further, the self-contained 12 volts battery of the recovery tool is identical to a typical car or truck battery. The self-contained 12 volts battery is easily accessible to allow attaching jumper cables to the self-contained 12 volts battery to jump start Tractors, Lawn mowers, cars, trucks, boats etc.; anything that takes 12 volt power. The self-contained 12 volts battery gets its trickle charge feed to charge the self-contained 12 volts battery by plugging it in to vehicle side 7-way plug which is mounted and the back of all new vehicle and most other older ones.

In an example embodiment, the recovery tool 10 is configured to interconnect to all vehicles with a class III hitch and up 12. In an example implementation, jack leg pin is pulled and jack legs 1c are unlocked on both sides of recovery tool. Jack legs 1c are turned in the upright position and jack handles are turned counterclockwise to lower jacks and until recovery tool raises up to proper height and lines up with vehicle receiver hitch. Once recovery tool is raised up to the proper height it can be manually pushed into truck receiver hitch. Hole from receiver hitch of the vehicle is aligned to the hole on recover tool attachment bar 28 and safety pin 1v safety clip 1u and safety chains are Install to vehicle hitch. Once recovery tool is mounted to vehicle receiver hitch, the 7-way harness 1r from the recover tool is plugged into the vehicle 7-way wiring plug of the vehicle for the recovery tool to get its power to control reverse lights, left turn, right turn, parking lights, stop lights, 12-volt battery power and ground. The recovery tool can perform lift, drag, tow and pull once its mounted to vehicle receiver hitch class III and up.

Figure 5:
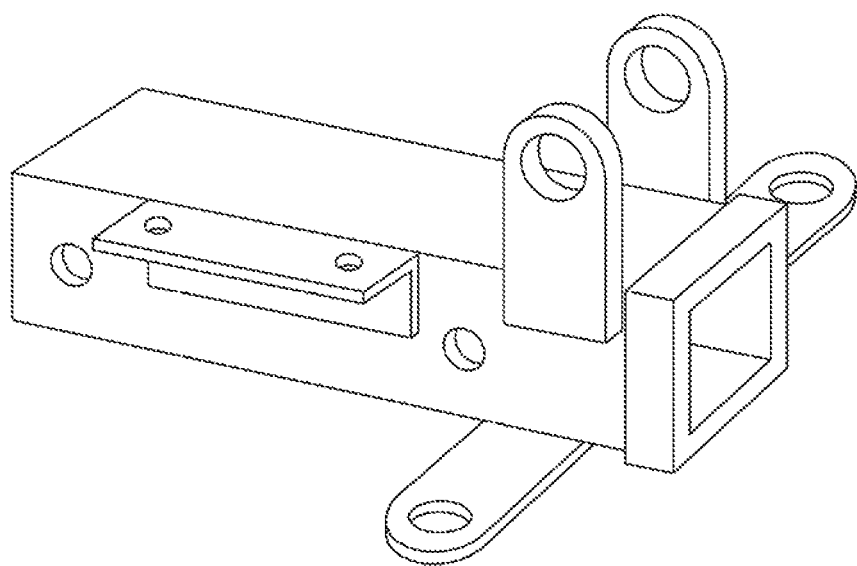
FIG. 5 shows connector tube according to an example embodiment.
Figure 6:
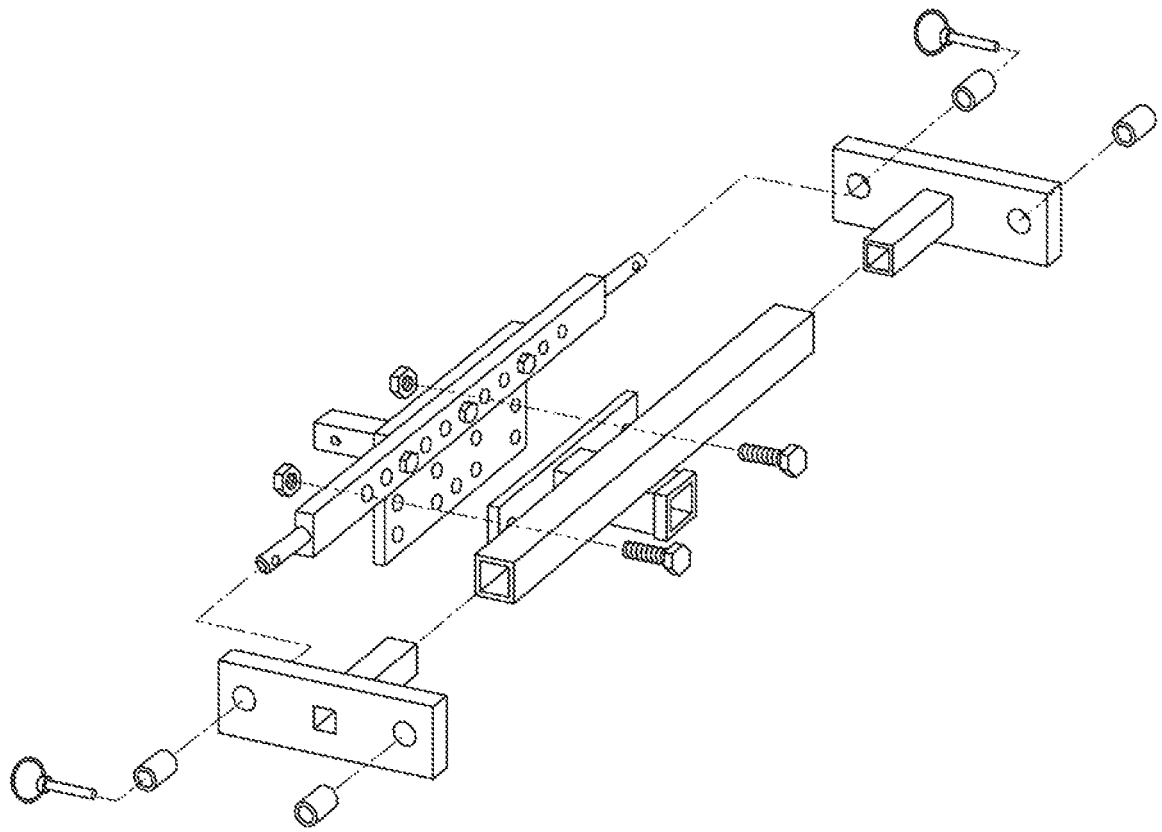
FIG. 6 shows a 3-point-implement attachment according to an example embodiment.

In an example embodiment, the recovery tool 10 is configured to perform lifting and dragging. The connector tube (which is shown in FIG. 5) is mounted to the recovery tool attachment bar 28, and 3-point implement pivot attachment (which is shown in FIG. 6) is mounted to the connector tube. The connector tube and 3-point implement pivot attachment is held on to the attachment bar 28 by a ⅝ hitch pin 1v and safety clip ref 1u, and the connector tube is pined to 3-point implement pivot attachment by the ⅝ hitch pin ref 1v and safety clip 1u. Once the connector tube and 3-point pivot attachment is installed to the recovery tool attachment bar, the recovery tool can perform lifting and dragging functions. The recovery tool has a double acting power unit and hydraulic ram bolted to connector tube which allows the recovery tool to perform lifting to 3-point implements that would be mounted to recovery tool 3-point implement pivot attachment.

In an example embodiment, the recovery tool 10 can perform towing by mounting connector tube (FIG. 5) to attachment bar 28 on the recovery tool. The connector tube is held on by the ⅝ hitch pin 1v and safety clip 1u. Once connector tube is installed and pined to attachment bar 28 on the recovery tool, users can install receiver and ball to connector tube (FIG. 5) and perform towing.

In an example embodiment, the recovery tool 28 is configured to perform pulling by using the electric 4500 lb. winch IK which is mounted to the recovery tool 10 and headgear frame 14. The recovery tool 10 performs pulling by using the winch IK which is controlled by a hand held wireless controller that sends a signal to the control box which is mounted to head gear frame 14. The recovery tool 10 supplies power to the winch IK from a self-contained battery 1Z that is mounted on to the attachment bar 28 of the recovery tool hitch attachment.

It is to be understood that the above description is intended to be illustrative, and not restrictive. For example, the above discussed embodiments may be used in combination with each other. Many other embodiments will be apparent to those of skill in the art upon reviewing the above description.

Whereas, the construction and method have been described in relation to the figures of the drawings, it should be understood that other and further modifications, apart from those shown or suggested herein, may be made within the spirit and scope of this inventive aspect.

What is claimed is:

1. A recovery tool releasably coupled to the rear or front of a vehicle-comprising:
   a head gear (14), a winch (IK), hydraulic unit which includes a hydraulic ram (1AA) that activates a double acting ram for 3-point attachments, and a hitch attachment (16),
   wherein the head gear (14) is made up of four pieces, two vertical uprights (22a, 22b), an angle (24) connected to the top of the two vertical uprights (22a, 22b), and a cross tube (26) connected to the bottom of the two vertical uprights (22a, 22b),
   wherein the winch (IK) is mounted to the angle (24) connected to the top of the two vertical uprights (22a, 22b),
   wherein the bottoms of the two vertical uprights (22a, 22b) of the head gear are further connected at their bottom to the hitch attachment (16), thereby mechanically and physically coupling said head gear to said hitch attachment (16), the hitch attachment comprising a hitch attachment bar (28),
   wherein the hitch attachment bar (28) is releasably coupled to the vehicle (12) via a vehicle hitch (30), and
   wherein the hitch attachment bar (28) extends under the head gear of the recovery tool from the vehicle hitch (30) to a connector tube, said connector tube being operably coupled to a 3-point pivot attachment, such that said vehicle hitch (30), said connector tube, and said 3-point pivot attachment are aligned,
   wherein once the connector tube and 3-point pivot attachment is operably coupled to the recovery tool attachment bar (28), the recovery tool can perform lifting and dragging functions,
   wherein the recovery tool has a double acting power unit and hydraulic ram bolted to connector tube which allows the recovery tool to perform lifting to 3-point implements that would be mounted to the 3-point implement pivot attachment of various accessory tools necessary to perform lift, drag, tow and pull using the vehicle (12), and
   wherein the accessory tools are selected from the group consisting of, a plow, a tractor, tillers, a mower, and a farm implement, each of which uses 3-point interconnect;
   a wireless controller configured to control operation of said recovery tool;
   a control box for said wireless controller, said control box coupled to said head gear,
   the winch attached to said head gear, said winch operationally connected to said wireless controller to allow remote control of the operation of said winch;
   the hydraulic ram attached to said hitch attachment bar;
   a power source to supply power for operation of said recovery tool,
   wherein the power source is a self-contained battery (1Z) for providing 12 volt power for the wireless controller and the accessory tools;
   wherein said recovery tool provides a 3-point interconnect and control between said vehicle and accessory tools to perform lift, drag, tow and pull using said vehicle.

2. The recovery tool of claim 1, wherein said hitch attachment is configured to interconnect and control between said vehicle and accessory tools used to perform lift, drag, tow or pull using said vehicle.

3. The recovery tool of claim 1, wherein said receiver hitch is receiver hitch class III.

4. The recovery tool of claim 1, wherein said receiver hitch is receiver hitch class III and up.

5. The recovery tool of claim 1, wherein said head gear comprises two vertical uprights, an angle connected to the top of said two vertical uprights, and a cross tube connected to the bottom of said two vertical uprights.

6. The recovery tool of claim 5, wherein said two vertical uprights are made from box tubing.

7. The recovery tool of claim 5, wherein said two vertical uprights are made from ¼"×4"×4" box tubing.

8. The recovery tool of claim 5, wherein said winch is mounted to said angle.

9. The recovery tool of claim 1, wherein said head gear comprises two vertical uprights, an angle connected to the top of said two vertical uprights, and a cross tube connected to the bottom of said two vertical uprights, said two vertical uprights connected at the bottom to said hitch attachment to connect said head gear to said hitch attachment.

10. The recovery tool of claim 9, wherein said two vertical uprights are connected to said hitch attachment by bolts and welding.

11. The recovery tool of claim 1, wherein said hitch attachment bar is configured to slide into said receiver hitch of said vehicle and pinned on to said receiver hitch.

12. The recovery tool of claim 1, wherein said hitch attachment bar is pinned on to said vehicle hitch using a ⅝"×4½" hitch pin with a clip.

13. The recovery tool of claim 1, wherein said hitch attachment bar is 2"×2" solid square bar of 24 inches length.

14. The recovery tool of claim 1, wherein said hitch attachment further including a rear support bar, rear support brackets, left support bracket, right support bracket and a lower support bracket, said left support bracket and said right support bracket adapted for mounting hydraulic unit and lights thereon, said rear support bar placed square to said hitch attachment bar, said hitch attachment bar is connected to said rear support bar, said rear support brackets connected to said rear support bar, said rear support brackets connected to said head gear to connect said hitch attachment to said head gear, said left support bracket and said right support bracket placed square to said rear support bar.

15. The recovery tool of claim 14, wherein said rear support bar is made from mild steel, solid metal bar.

16. The recovery tool of claim 1, wherein said hitch attachment is attached to said head gear by bolts.

17. The recovery tool of claim 1, wherein said hitch attachment is attached to said head gear by welding.

18. The recovery tool of claim 1, wherein said hitch attachment is attached to said head gear by bolts and welding.

19. The recovery tool of claim 1, wherein said winch is 4500 lbs winch.

20. The recovery tool of claim 1, wherein said recovery tool further includes halogen lights.

21. The recovery tool of claim 1, wherein said recovery tool further includes work lights.

22. The recovery tool of claim 1, wherein said recovery tool further includes left turn signal, right turn signal, parking lights, stop lights, tail lights, and brake lights.

23. The recovery tool of claim 1, wherein said accessory tools is a three-point tractor implement attachment.

24. The recovery tool of claim 1, wherein said accessory tools is a three-point tractor back drag blades.

25. The recovery tool of claim 1, wherein said vehicle is selected from a list including a hummer truck, pickup truck, trailer, tractor, all-terrain vehicles, and maintenance vehicles.

26. The recovery tool of claim 1, wherein said head gear, said hitch attachment, said control box for wireless controller are made from mild steel metal.

27. The recovery tool of claim 1, wherein said head gear, said hitch attachment, said control box for wireless controller are made from stainless steel.

28. The recovery tool of claim 1, wherein said head gear, said hitch attachment, said control box for wireless controller are made from aluminum.

29. A recovery tool releasably coupled to the rear or front of a vehicle comprising:

- a head gear (14), a winch (IK), a hydraulic unit which includes a hydraulic ram that activates a double acting ram for 3-point attachments, and a hitch attachment (16),
- wherein the head gear (14) is made up of four pieces, two vertical uprights (22a, 22b), an angle (24) connected to the top of the two vertical uprights (22a, 22b), and a cross tube (26) connected to the bottom of the two vertical uprights (22a, 22b),
- wherein the winch (IK) is mounted to the angle (24) connected to the top of the two vertical (22a, 22b),
- wherein the bottoms of the two vertical uprights (22a, 22b) of the head gear are further connected at their bottom to the hitch attachment (16), thereby mechanically and physically coupling said head gear to said hitch attachment (16), the hitch attachment comprising a hitch attachment bar (28),
- wherein the hitch attachment bar (28) is releasably coupled to the vehicle (12) via a vehicle hitch (30), and
- wherein the hitch attachment bar (28) extends under the head gear of the recovery tool from the vehicle hitch (30) to a connector tube, said connector tube being operably coupled to a 3-point pivot attachment, such that said vehicle hitch (30), said connector tube, and said 3-point pivot attachment are aligned,
- wherein once the connector tube and 3-point pivot attachment is operably coupled to the recovery tool attachment bar (28), the recovery tool can perform lifting and dragging functions,
- wherein the recovery tool has a double acting power unit and hydraulic ram bolted to connector tube which allows the recovery tool to perform lifting to 3-point implements that would be mounted to the 3-point implement pivot attachment of various accessory tools necessary to perform lift, drag, tow and pull using the vehicle (12), and
- wherein the accessory tools are selected from the group consisting of a plow, a tractor, tillers, a mower, and a farm implement, each of which uses 3-point interconnect.

30. A method for using a recovery tool having a low profile headgear, comprising:

providing a recovery tool releasably coupled to the rear or front of a vehicle comprising:

- a head gear (14), a winch (IK), hydraulic unit which includes a hydraulic ram that activates the double acting ram for 3-point attachments, and a hitch attachment (16),
- wherein the head gear (14) is made up of four pieces, two vertical uprights (22a, 22b), an angle (24) connected to the top of the two vertical uprights (22a, 22b), and a cross tube (26) connected to the bottom of the two vertical uprights (22a, 22b),
- wherein the winch (IK) is mounted to the angle (24) connected to the top of the two vertical uprights (22a, 22b),
- wherein the bottoms of the two vertical uprights (22a, 22b) of the head gear are further connected at their bottom to the hitch attachment (16), thereby mechanically and physically coupling said head gear to said hitch attachment (16), the hitch attachment comprising a hitch attachment bar (28),
- wherein the hitch attachment bar (28) is releasably coupled to the vehicle (12) via a vehicle hitch (30), and
- wherein the hitch attachment bar (28) extends under the head gear of the recovery tool from the vehicle hitch (30) to a connector tube, said connector tube being operably coupled to a 3-point pivot attachment, such that said vehicle hitch (30), said connector tube, and said 3-point pivot attachment are aligned;

extending the hitch attachment bar (28) under the head gear of the recovery tool from the vehicle hitch (30) to a connector tube; and operably coupling the connector tube to a 3-point pivot attachment;

operably coupling the recovery tool attachment bar (28), wherein the recovery tool has a double acting power unit and hydraulic ram bolted to connector tube;

the recovery tool performing lifting to 3-point implements that are mounted to the 3-point implement pivot attachment of various accessory tools necessary to perform lift, drag, tow and pull using the vehicle (12).

31. The method of claim 29, wherein the accessory tools are selected from the group consisting of a plow, a tractor, tillers, a mower, and a farm implement, each of which uses 3-point interconnect.

* * * * *